March 22, 1927.
R. H. WALLACE
METHOD OF SUPPORTING LIFE IN LIVING ORGANISMS IN SEALED CONTAINERS AND DEVICE THEREFOR
Filed June 10, 1926
1,621,818
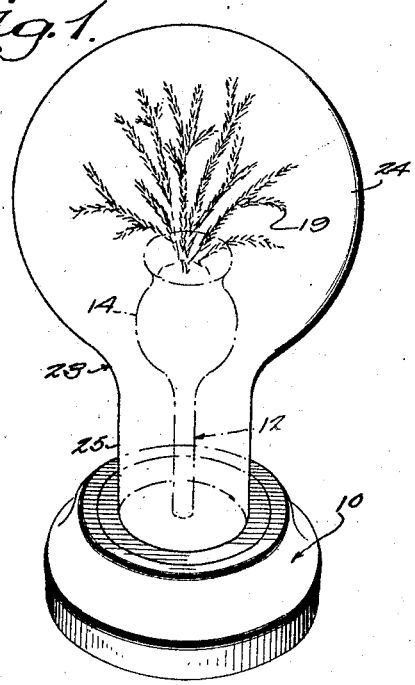
Fig.1.
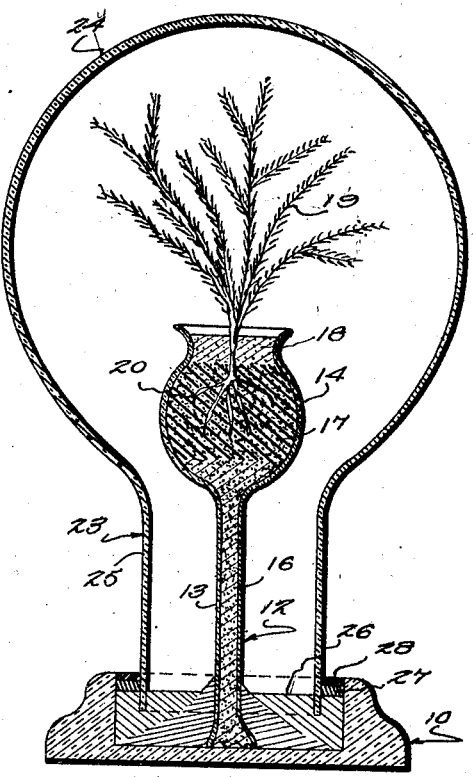
Fig.2.
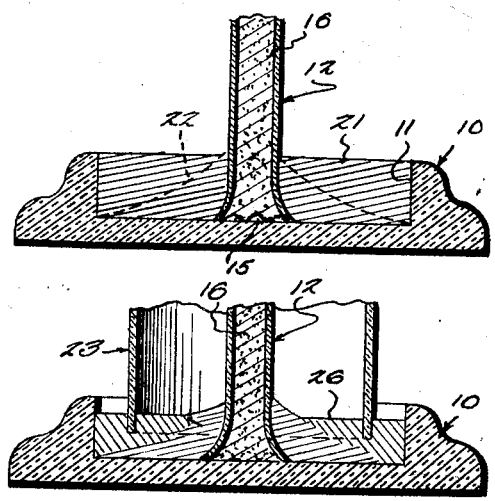
Fig.3.
Fig.4.
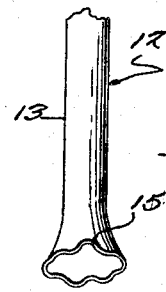
Fig.5.
Inventor
RAYMOND H. WALLACE
By C. H. Parken
Attorney Patented Mar. 22, 1927.

1,621,818

UNITED STATES PATENT OFFICE.

RAYMOND H. WALLACE, OF LIVERMORE, IOWA.

METHOD OF SUPPORTING LIFE IN LIVING ORGANISMS IN SEALED CONTAINERS AND DEVICE THEREFOR.

Application filed June 10, 1926. Serial No. 115,094.

This invention relates to a method of supporting life in living organisms in sealed containers, and device therefor.

An important object of the invention is to provide a method of the character outlined wherein advantage is taken of the more or less "balanced" plant life processes of photosynthesis and respiration in such a manner as to maintain certain plant life essentials in proximity to the plant to be absorbed thereby. In the process of photosynthesis, carbon dioxid absorbed by the plant combines with water, in the presence of light, to form carbohydrate and set free oxygen. In the process of respiration, the carbohydrate formed in the manner described, plus oxygen breaks down to form carbon dioxid and water, the action taking place in either light or darkness. The oxygen set free during photosnythesis is taken up during respiration, and conversely the carbon dioxide set free during respiration is taken up during photosynthesis. In the present method the oxygen and carbon dioxid thus set free by the plant are maintained substantially in proximity to the plant to be reasorbed thereby.

A further object is to utilize both the metabolic and transpiration water, given off by the plant, for supplying water to the plant roots.

A further object of the invention is to provide a device for carrying out the objects of the method, wherein a plant is placed in suitable medium and is placed in a hermetically sealed container whereby the oxygen and carbon dioxid will be maintained substantially in proximity to the plant to be reabsorbed thereby, while the water is returned to the roots of the plant for reabsorption.

A further object is to provide a device of the above mentioned character having means for returning the metabolic and transpiration water to the roots of the plant by capillarity.

A further object is to provide a device of the above mentioned character wherein a container for the plant soil is arranged over and supported by a suitable base, and wherein a suitable transparent cover is arranged over the plant and embedded in sealing material carried by the base whereby the cover is hermetically sealed against all outside influences except light and heat.

I have found that the present method is applicable to all plants of the vascular type, plants of this type carrying out the cycles of operation previously referred to. It is well known that bacteria are necessary in the soil in which a plant is rooted in order properly to support plant life. Accordingly, I employ soil which is rich in bacteria, and the soil selected should be of the proper character and quantity according to the size and character of the plant to be placed in the sealed container. The soil essentials are supplied to the plant through the roots thereof in the usual manner, and it has been found that for a relatively small plant, a relatively small quantity of soil may be employed, and this soil will not become too greatly impoverished at least for several years. Before sealing the plant and soil in a suitable container, sufficient water is supplied to the soil. Any suitable hermetic sealing means may be employed so long as the plant has access to sufficient light, as will be apparent. Photosnythesis and respiration will be carried out in the usual manner and oxygen and carbon dioxid will be maintained substantially in proximity to the plant by the sealed system employed, whereby they may be reabsorbed by the plant due to the natural functions thereof. The metabolic and transpiration water given off is collected in any suitable manner, and in practice the collection of water takes place preferably by absorption through a capillary medium whereby it may be returned to the roots of the plant for reabsorption. The method described sets up a balanced system wherein sufficient oxygen and carbon dioxid are maintained in proximity to the plant to supply the natural demands thereof, and the growth of the plant will continue almost indefinitely. During such growth the only substances supplied to the plant other than the oxygen, carbon dioxid and water referred to, will be that supplied to the plant by the soil materials.

In the drawings I have shown one form of device particularly adapted for carrying out the method. In this showing:

Figure 1 is a perspective view,

Figure 2 is a central vertical sectional view,

Figure 3 is a fragmentary central vertical sectional view showing the initial stage of assembling the elements of the device, Figure 4 is a similar view showing later stages in the assembly, and, Figure 5 is a fragmentary detail of the lower end of the plant supporting member.

Referring to the drawings, the numeral 10 designates a suitable supporting base, which for decorative purposes, is preferably formed of glass, as shown. The base may be made in any desired form, but for the purpose of illustration I have shown a substantially circular base having a circular recess 11 formed in its upper face. A suitable plant supporting member 12 is adapted to be supported on the base, the lower end of the member 12 being arranged preferably at the bottom of the recess 11. In practice, I may employ as the supporting member 12 an ordinary thistle tube having a lower stem portion 13 and an upper bowl portion 14. Before placing the supporting member in position, the lower end of the tube 13 is preferably heated and portions thereof are bent outwardly as at 15 so that the lower end of the tube will not seat firmly against the bottom of the recess.

The tube 13 and the lower portion of the bowl 14 may contain a body of sand 16. In practice, I prefer to employ white sand for its decorative qualities, but it will become apparent that I may employ any suitable capillary medium in place of the sand, such as mineral asbestos and the like. A body of soil 17 is arranged in the bowl 14 above the sand previously described, and the soil may be covered by a layer of white sand 18 for decorative purposes. The soil employed is preferably rich and dark and attractively contrasts with the much lighter layers of sand arranged above and below the soil. It should be understood, however, that the function of the method is not in any way dependent upon the particular material employed in the thistle tube above and below the soil. For the sake of illustration I have shown the system as being used for supporting life in a plant of club moss 19, the roots 20 of which are embedded in the soil 17, as will be apparent.

In placing the supporting member 12 in position, a suitable plastic medium is preferably employed which will harden to serve as a support for the supporting member 12, but which is adapted to absorb moisture for a purpose to be described. In practice I have found ordinary plaster of Paris as being excellent for the purpose. The supporting member is held in a vertical position, as shown and a quantity of the plastic material is poured into the recess 11 and permitted to harden. The material is then cut in any suitable manner substantially to the shape indicated by the dotted line 22 for a purpose to be described. The soil is supplied with a sufficient quantity of water after which it is desired to seal the plant from all outside influences except light.

As an enclosing means I may employ a cover or bulb indicated as a whole by the numeral 23. The cover is preferably formed of glass so that the plant will be visible therethrough and in order that light will be supplied to the plant. The cover 23 has an upper enlarged bulb shaped portion 24 and a lower substantially cylindrical portion 25 which is normally open at its lower end. When it is desired to seal the system, additional plaster of Paris 26 is poured into the recess 11 over the plaster of Paris previously placed therein. While the sealing medium 26 is still in a plastic condition, the cover 23 is placed in position as indicated in Figure 4. The upper level of the sealing medium 26 is preferably a substantial distance below the upper edge of the base 10 as clearly shown in Figure 4. As previously stated, the plaster of Paris is a moisture absorbing medium, and it is desired to seal this medium against the absorption of moisture between the cover 23 and the wall of the recess 11. After the plaster of Paris 26 hardens, a layer of a different sealing medium 27 is poured into the space between the cover 23 and the wall of the recess 11, the upper level of the medium 27 also being below the level of the top of the base. As the sealing medium 27 I prefer to employ a cement formed of litharge and glycerine since this material will adhere to the plaster of Paris. A layer of a sealing medium 28, which will be impervious to moisture, is then poured over the layer 27 and as the upper sealing medium I prefer to employ ordinary sealing wax. This material will not absorb moisture and forms a perfect seal to prevent the entrance of moisture or other extraneous matter into the cover 23. The upper surface of the sealing wax may be colored in any suitable manner, such as providing it with a coat of whitening.

The operation of the device is as follows:

The processes of photosynthesis and respiration are carried out within the cover 23 in the usual manner, free oxygen being given off from the plant during photosynthesis while carbon dioxid is given off during respiration. It will be apparent that with the hermetically sealed container described, the oxygen and carbon dioxid will be maintained substantially in proximity to the plant to be reabsorbed thereby during the natural functions referred to. The metabolic and transpiration water also will be retained in the system and will be continuously absorbed by the plaster of Paris. The moisture finds its way into the lower end of the thistle tube or other supporting means, the lower end thereof being bent outwardly as at 15 to permit the moisture freely to enter the interior of the tube 15 to be absorbed by the sand or other capillary medium. The moisture is returned to the earth 17 and thence to the roots of the plant by capillarity as will be apparent. The actions referred to will be carried out continuously and the plant will thrive and grow for a long period of time, the only additional substances supplied to the plant other than the oxygen, carbon dioxid and water referred to, being that supplied by the soil.

It is to be understood that the method described and the form of device for carrying out the method, may be greatly varied, without departing from the spirit of the invention or the scope of the subjoined claims.

I claim:

1. The method of supporting plant life in a hermetically closed system which consists in retaining oxygen and carbon dioxid given off by the plant during photosynthesis and respiration in proximity to the plant to be reabsorbed thereby, and returning metabolic and respiration water to the roots of the plant.

2. The method of supporting plant life in a hermetically closed system which consists in retaining oxygen and carbon dioxid given off by the plant during photosynthesis and respiration in proximity to the plant to be reabsorbed thereby, and returning metabolic and respiration water to the plant.

3. The method of supporting plant life in a hermetically closed system which consists in embedding the roots of the plant in soil containing moisture, placing the plant and soil in the hermetically closed system to retain the oxygen and carbon dioxid given off by the plant during photosynthesis and respiration in proximity to the plant to be reabsorbed thereby, and returning metabolic and respiration water to the roots of the plant.

4. The method of supporting plant life which consists in embedding the roots of the plant in bacteria bearing soil, adding water to the soil, placing the plant and soil in a hermetically closed system to retain oxygen and carbon dioxid given off by the plant during photosynthesis and respiration in proximity to the plant to be reabsorbed thereby, and returning metabolic and respiration water to the soil to be reabsorbed by the roots of the plant.

5. A device of the character described comprising a hermetically sealed container, a vertical plant support in said container including a tubular lower stem, and a capillary medium in said stem for returning to the roots of the plant metabolic and respiration water given off by the plant.

6. A device of the character described comprising a hermetically sealed container including a lower base, a vertical plant support projecting upwardly from said base, said support including a tubular lower stem and an enlarged bowl shaped upper end adapted to contain soil in which the roots of a plant are embedded, and a capillary medium filling said stem for returning metabolic and respiration water from the interior of the container to the soil to be reabsorbed by the roots of the plant.

7. A device of the character described comprising a base having a circular recess in its upper face, a plant support extending upwardly from said base, said support including a tubular lower stem and an enlarged bowl shaped upper end adapted to contain soil in which the roots of a plant are embedded, a capillary medium filling said stem, and a cover over the plant, said cover having its lower end arranged in the recess in said base and hermetically sealed thereto.

8. A device of the character described comprising a base having a circular recess in its upper face, a plant support extending upwardly from said base, said support including a tubular lower stem and an enlarged bowl shaped upper end adapted to contain soil in which the roots of a plant are embedded, a capillary medium filling the stem, a cover enclosing the plant and having its lower end arranged in the recess in said base, means for effecting a hermetic seal between said cover and said base, and a porous material arranged in the recess in said base within said cover and adapted to act as a supporting means for said support, said porous material having capillary qualities and contacting with the capillary medium in said stem.

9. A device of the character described comprising a base having a circular recess in its upper face, a plant support extending upwardly from said base, said support including a tubular lower stem having an irregularly shaped extremity resting upon said base and an enlarged bowl shaped upper end adapted to contain soil in which the roots of the plant are embedded, a capillary medium filling the stem, a transparent cover enclosing the plant and having an open lower end arranged in the recess in said base, means for effecting a hermetic seal between said cover and said base and including a material which is impervious to moisture arranged in the recess in said base between the wall of the recess and the lower end of said cover, and a porous material arranged in the recess in said base within said cover and adapted to act as a supporting means for said support, said porous material having capillary qualities and contacting with the capillary medium in said stem.

In testimony whereof I affix my signature.

RAYMOND H. WALLACE.